Feb. 7, 1956　　　　A. S. PATTEN　　　　2,734,118
METHOD OF ELECTRIC WELDING
Filed March 5, 1953　　　　　　　　　　　　2 Sheets-Sheet 1

Inventor
Alexander S. Patten

By Owen & Owen
Attorneys

Feb. 7, 1956   A. S. PATTEN   2,734,118
METHOD OF ELECTRIC WELDING
Filed March 5, 1953   2 Sheets-Sheet 2

INITIAL STAGE

INTERMEDIATE STAGE

FINAL STAGE

Inventor
Alexander S. Patten

By Owen & Owen
Attorneys.

United States Patent Office 2,734,118
Patented Feb. 7, 1956

2,734,118

METHOD OF ELECTRIC WELDING

Alexander S. Patten, Toledo, Ohio, assignor to The Prestole Corporation, Toledo, Ohio, a corporation of Michigan Application March 5, 1953, Serial No. 340,463

7 Claims. (Cl. 219—10)

This invention relates to electrical resistance welding, and is particularly applicable to the welding together of two metal parts having different electrical resistance characteristics.

In the methods heretofore employed for the welding of one metal article to another and known as "projection" welding, it has been common to provide protuberances on one member at the side thereof intended to contact the other member, to hold the members together under pressure during welding, and to apply a welding heat simultaneously to both members whereby the protuberances of one and the adjacent contacting areas of the other are simultaneously softened to a welding condition. When the contacting parts are thus softened, the applied pressure causes a quick collapse of the supporting protuberances, so that the metal thereof, instead of being projected into the contact area of the other member, is flattened out between the adjacent body surfaces of the members. This frequently causes a weak and uncertain welding connection at the junction of the two members, resulting in weld failures. With these methods a resultant welding flash detrimental to the product also occurs. Furthermore, it has been established in practice that these methods are not satisfactory in welding together metals of different electrical characteristics but, under such circumstances, result almost invariably in weld failures.

The primary object of the present invention is to obviate the above-noted objections and to provide a method of welding together two metal parts having the same or different electrical resistance characteristics in a simple, efficient, economical and rapid manner.

Another object of the invention is the provision of an electrical resistance welding method wherein a metal part with one or more protuberances is welded to the other part with the protuberances interengaged with the contact surface of the other member and in such interengagement maintaining their original shape and form, except for thin surface portions of the protuberances which are only softened sufficiently to become firmly bonded to the other member into which projected.

Another object of the invention is to provide a method of electrical resistance welding wherein a metal part with one or more protuberances is welded to the other part with the protuberances of one interengaged with the contact surface of the other in such a manner that welding flash is prevented and the effects of welding flash on the completed product eliminated.

Another advantage of the invention is the fact that with it welding can be accomplished at a rate of speed that is considerably higher than with known methods. For instance, "projection" or spot welding at a rate of 30 to 40 per minute is considered excellent. The present method makes it possible to achieve speeds as high as 200 per minute or more.

Further objects and advantages of the invention will be apparent from the following detailed description, and from the accompanying drawings illustrating one manner of practicing the method and the work performed thereby, in which Fig. 1 is a diagram of an electric welding apparatus which may be used in the performance of the method, with two work-pieces clamped between the electrodes preparatory to being welded together;

Figure 1:
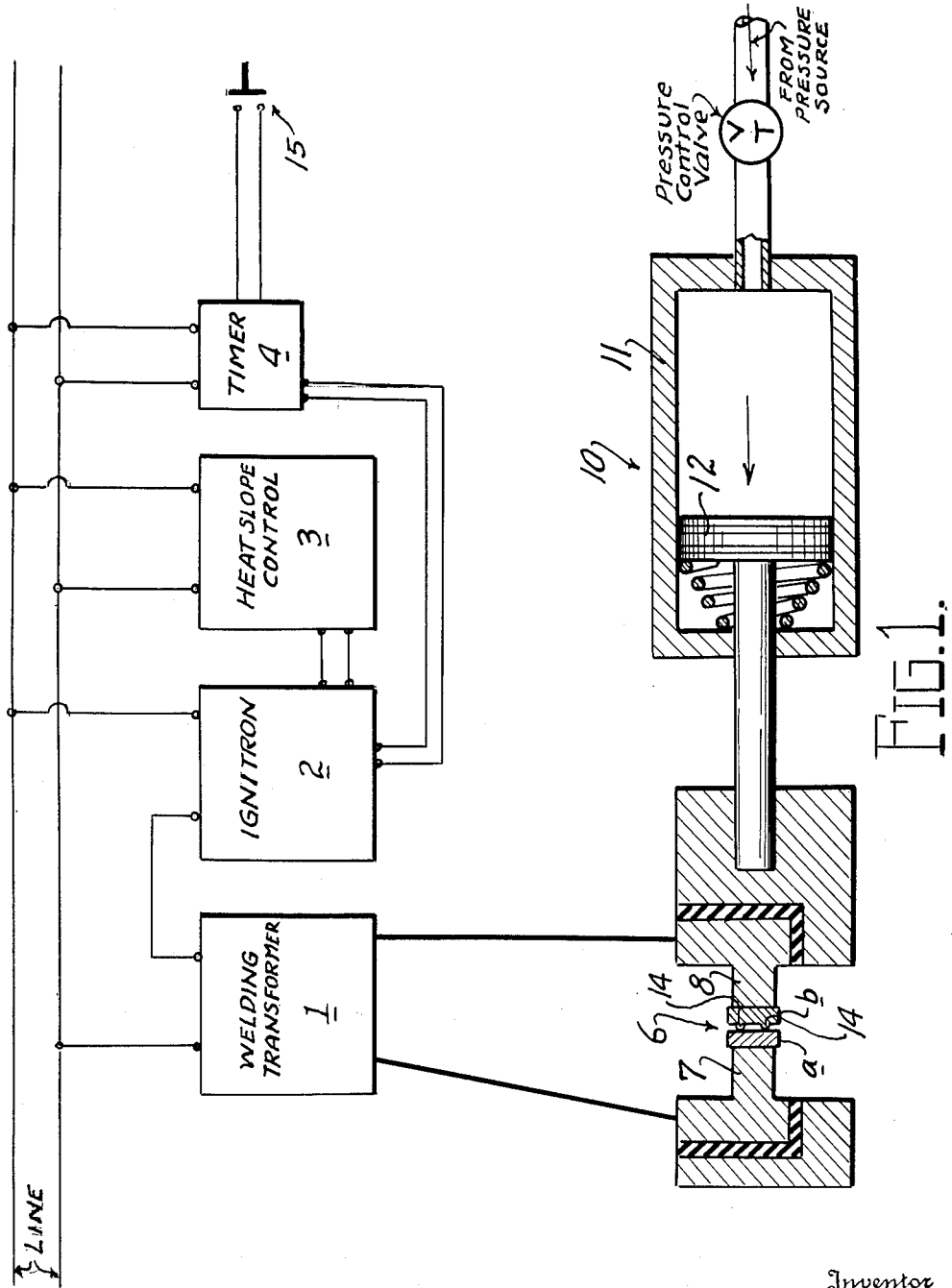

The preferred method of practicing the present invention requires a welding machine employing, as illustrated in Fig. 1, a welding transformer unit 1, an ignitron contactor unit 2, a heat and slope control unit 3, and an electronic timing device unit 4, all of which are well known in the art. These units, together with a means of applying a clamping pressure to the articles being welded, constitute the essential features of an apparatus now being employed to practice the invention.

The transformer 1 may be of either the fixed or portable type. While in one particular instance of application a transformer of 37.5 kva. rating was employed, it will be understood that the size and rating of the transformer is dependent on the nature of the work to be accomplished. It is known that the desirable rating of a transformer for any particular welding operation will not vary more than 10% from the rating that could be calculated by those skilled in the art for regular projection welding. However, since the present method of welding will permit the welding of two metal articles at speeds far in excess of known methods, it is necessary to add a service factor rating to the normal calculations. Such additional rating could be as follows:

| Speed per minute | Rating |
| --- | --- |
| 1-25 | Normal. |
| 26-49 | Normal×1.25. |
| 50-74 | Normal×1.50. |
| 75-99 | Normal×1.75. |
| 100-124 | Normal×2.00. |
| 125-150 | Normal×2.50. |
| 150 and more | Normal×3.00. |

Because of the exacting control that the present method requires, the transformer selected should be supplied with tap switches for the proper adjustment of secondary voltages.

The work 6 to be welded is clamped between customary electrodes 7 and 8 in the transformer circuit. In the present instance, the electrode 7 is stationary and the other is movable by any suitably controlled pressure means 10 to apply the desired welding pressure to the work. Such means is illustrated as comprising a fluid pressure cylinder 11 (Fig. 1) into which controlled fluid pressure is admitted and acts on a plunger 12 to impart welding pressure to the work in opposition to the stationary electrode 7.

The ignitron contactor 2, a unit commonly used in electric welding, must be of adequate capacity to actuate the primary circuits of the welding transformer. This control unit preferably should be of the type that is actuated immediately upon the closure of the control circuit and which stops at the zero point of the current wave when the control circuit is open.

The heat and slope control unit 3 controls the current through the welding transformer to apply a gradient electric welding heat to the members being welded, as well understood in the electric welding art. This unit should be capable of permitting an initial adjustment of from 10% to 95% of final heat, a final adjustment of from 40% to 100% of available transformer heat, and a time adjustment necessary to permit a rise in welding heat from the initial heat to the final heat over a predetermined period.

The timing unit 4 should preferably be of the electronic type of a size and capacity capable of actuating the particular ignitron contactor used, and should be accurately adjustable for a time range of from 1 to 120 cycles. Units of this type are known in the art.

In the present instance, the work 6 to be welded compresises articles *a* and *b* of different electrical resistance characteristics, article *a* having the lesser and article *b* the greater resistance. While these articles may be of various shapes and sizes, they are illustrated as comprising comparatively small items, such for instance as a mild steel nut for the article *a* and a spring metal clip or carrying member for the article *b*. It is in the welding of these small items that this invention has been particularly employed.

In practicing the present method, it is important to provide one or more protuberances 14 on the face of article *b* for penetration into and welding to the other article. In the present instance, the protuberances are preferably four in number and positioned to bear against the nut face between the threaded opening and the nut periphery in approximately equidistantly spaced relation therearound. While it is not new to use projections on the face of one work member to be welded to the adjacent face of the other, it is new, so far as I am aware, to use such projections in the satisfactory welding together of two articles having different electrical resistance characteristics and also in the welding together of articles having the same or substantailly the same electrical resisttance characteristics where the projections of one member penetrate the other and remain substantially intact during the welding operation.

In the previous methods of resistance welding in which projections have been employed on the face of one member to be later utilized to effect a welding bond between the members, through the simultaneous application of electrical resistance heat and pressure, the shape and height of the projections are not particularly important, adequate end results being obtained with a wide range of shapes and sizes for any particular operation.

In order, however, to produce completely satisfactory results by use of the present method, which may be termed "identation" welding, the shape and size of the protuberances are important. In order to maintain an even control over the welding process, the preferable shape of the protuberance ends should be substantially spherical. Other shapes would be satisfactory if they provided a lead angle for penetration and were free of any points or sharp edges where a concentration of heat would cause any material softening prior to penetration.

The diameter of a protuberance 14 at its base varies with the nature of the weld and the size of the articles being welded. The practical limits of the protuberance base diameter being from .050" to .500". Lesser diameters than .050" are difficult to produce, whether the protuberance is machined or stamped into the metal. Diameters of less than .050" are apt to vary in consistency. Diameters of more than .500" would not seem to fall within the practical limits of this invention.

The height of a protuberance 14 will also vary with the nature of the work, the most practical height being in the nature of from 20% to 100% of the base diameter of the protuberance. Past performance of the present method has shown that the most satisfactory operation will result if the height of a protuberance is maintained from 30% to 50% of its diameter. A height of less than 20% will result in an incomplete and unsatisfactory weld and a height of more than 100% of the base diameter of the protuberance is found to result in an incomplete penetration by the protuberance and the possible weakening of the protuberance at its base. In metals of varying electrical resistance characteristics, the protuberances must be placed on the metal having the greater electrical resistance.

Figure 2:
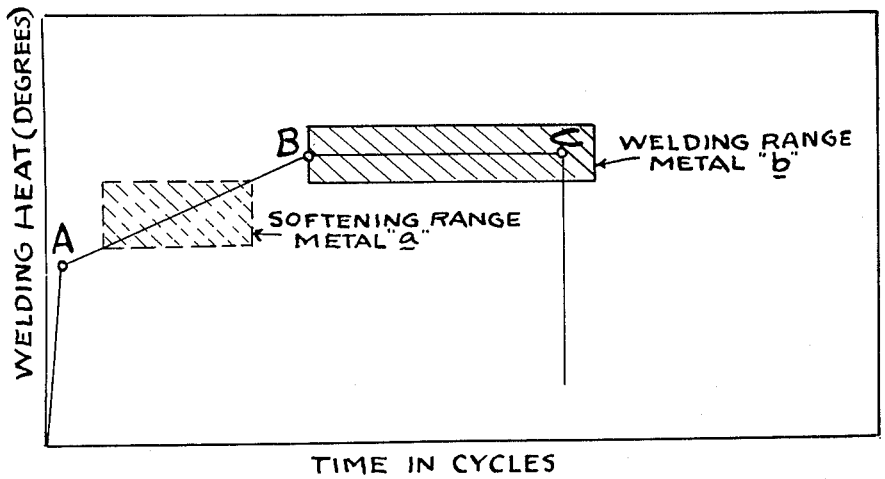
Fig. 2 is a diagram illustrating the welding time and heat range employed in practicing the invention.

In the welding time and heat diagram shown in Fig. 2, the curve ABC defines the complete welding cycle. The section AB of this curve line defines that part of the welding cycle necessary to bring the metal of member *a* to welding condition, and the section BC of curve line ABC defines that part of the welding cycle necessary to complete the integration of the members *a* and *b* being welded. The welding temperature at A must be less than the welding temperature of the metal of member *a*. The practical range or length of the section AB of the curve ABC may be from 2 to 60 cycles, depending upon the resistance characteristics and the welding temperature differentials of the two metals to be welded. The welding temperature at point B on the curve, and which is constant along the section BC, is a variable, being dependent on the resistance characteristics, the particular metals undergoing the welding process, the differentials in welding temperatures, and the cyclic rate of operation. The last-named variable is controlled by the length of the section BC of the curve line ABC, the practical range of which is from 2 to 120 cycles.

Figure 4:
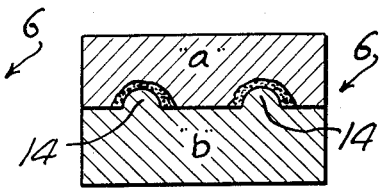
Fig. 4 illustrates an intermediate welding stage with the protuberances on one work-piece projected into the softened metal of the other but still in their original state.
Figure 5:
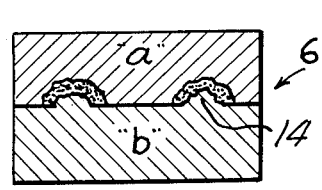
Fig. 5 illustrates the final welding stage of the work-pieces.

During the period of operation along the curve line ABC from point A to point B, the metal of member *a* softens at its area of contact with the protuberances 14 and is penetrated by the unsoftened protuberances of the member *b*, as illustrated in Fig. 4. The angle of slope of the curve section AB depends largely on the welding temperature differentials of the two metals and the speed with which it is desired to bring the metal of member *a* to welding temperature. It is important to a satisfactory "indentation" weld, such as produced by the present method, that the protruding element of member *b* retain its basic form and rigidity during the entire welding process, with the exception of a small surface area that contacts and is bonded to the softened metal of the other member into which it is projected, as illustrated in Fig. 5. This effects an integral welding connection between the protruding element of member *b* and the body of member *a* without destroying the original anchorage of the protuberance to its member. In this manner, the surface area of the protuberances are integrated in penetrating relation with the other member, thus forming a broad area of contact therebetween, while the base connection of the protuberances with member *b* remain in their firm unweakened original state, or at least substantially so.

In high speed welding operations, it may be necessary to confine the total welding time to six cycles. For instance, in welding a standard 5/16–24 square nut (1010 steel) to a .035" strip of carbon steel (1060) the difference in welding temperature of the two metals permits a relatively steep angle of slope over a three-cycle period and an additional three cycles at constant heat to effect a satisfactory weld. However, substituting a different type nut (1112 steel) or a .025" strip of carbon steel (1060) under the above-stated conditions, will produce an unsatisfactory weld. Decreasing the angle of slope will result in a satisfactory weld over the same cyclic elements of time. The same effect could be achieved by extending the slope period and the overall welding time. It is thus apparent that the length of slope, the angle of slope, and the overall time of the complete welding cycle may be varied to meet a wide variety of conditions. To meet such conditions the initial welding heat value at point A on the curve line ABC may be varied within the practical limits of from 40% to 95% of the final heat value at point B. The complete welding time may be varied over a practical range of from 2 to 120 cycles.

An important feature of the present method is the elimination of welding flash during the welding operation. Insofar as I am aware, methods of resistance welding heretofore employed for integrating two metal articles at points of contact are objectionable since considerable flashing occurs in the welding operation. This objection is particularly present in welding operations where the results of flash must be removed by secondary operations. For instance, in the welding of a nut to a steel member flashing occurs and results in injury to the nut threads, thus rendering a re-tapping operation necessary.

In the method of resistance welding heretofore employed and commonly referred to as "projection" welding, the projections from one member are securely held against the face of the other member under applied pressure. As the welding cycle is initiated the entire projection softens immediately and due to the applied pressure is caused to break down or collapse. This results in a quick disintegration of the softened projection and causes molten metal to spray in every direction.

With the present method, this flash or spraying of molten metal is prevented by substantially maintaining the rigidity and form of the protuberances during the welding operation instead of softening them and permitting their callapse and instantaneous abutment of the opposing members with the resultant spray of molten material.

The elimination of flash or metal spray permits automatic and continuous welding operations at a speed far in excess of those possible under previously known methods of welding. In continuous high speed strip welding, flash metal often adheres to mobile or stationary mechanical parts, resulting in improper functions of the apparatus and subsequent machine failure.

As is readily understandable, pressure plays a large role in a successful indentation weld. This is particularly true when the welding process is at relatively high-speeds. At modest welding speeds, let us say from ten to twenty per minute, pressure is important, but not critical. At welding speeds of from 150 to 200 per minute, pressure is every bit as critical as the slope of the time-temperature curve.

In welding a 5/16-24 nut (1010 steel) to a .035" strip of carbon steel (1060), it is necessary to utilize a 37.5 kva. welder with a maximum secondary voltage of about 15 volts to support a production speed of about 160 per minute. To meet this rate of production it was found that a total welding time of 6 cycles was satisfactory. Three of the six cycles were expended in bringing the surface of the nut to welding conditions and permitting the protuberances to penetrate that surface, the balance of three cycles was used to complete the weld. Under those conditions the final slope heat was about 90% of total available from the transformer and the initial slope heat was about 50% of the final slope heat. It was found that the proper pressure for a sound weld in such case was in the nature of 350 pounds per square inch. Variations of more than 5% either above or below this level resulted in weld failure. Pressure of more than 5% above resulted in the failure or breaking down of the protuberance prior to penetration, resulting in an incomplete weld also due to incomplete penetration. On both sides of the maximum and minimum tolerances considerable welding flash was observed and the results of the flash caused interference across the threaded area of the nut. It was found, however, that by adjusting the total weld time and the slope it was possible to correct this condition. Thus, it was immediately apparent that within reasonable limits pressure was a direct function of the welding time, and the initial and final welding temperatures.

In the original practice of the invention it was found that for welding speeds in excess of 75 per minute, the use of spring pads for pressure purposes was impractical since they would not hold with any constancy, and for that reason pressure was applied by means of air or hydraulic cylinders. It has also been found that the practical range of applied pressure is from 10 to 25 pounds per square inch for each .001" of protuberance height.

Figure 3:
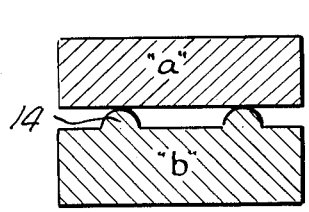
Fig. 3 illustrates two work-pieces in initial contact preparatory to welding together.

In practicing the present welding method, the work 6 to be welded is placed between the electrodes 7 and 8, and fluid pressure admitted to the cylinder 11 to apply the requisite pressure to the work by the electrodes. The welding control switch 15 is then closed to energize the timer 4, ignitron contactor 2, heat and slope control 3 and transformer 1, and the weld is effected in the manner hereinafter described. This welding method is illustrated in Figs. 3, 4 and 5, in which Fig. 3 shows the appearance and condition of the two work members at the initial or starting stage of a weld; Fig. 4 shows the appearance and condition of the members at the intermediate stage of the operation with the protuberances 14 projected into the softened metal of member $a$ but still retaining substantially their original form, and Fig. 5 illustrates the appearance and condition of the weld when completed. This last stage takes place in range BC of the time and welding heat diagram (Fig. 2) and shows the protuberances as still substantially retaining their firm unsoftened condition except for their surface portions which are only sufficiently softened to effect a strong and durable bond with the previously softened metal of the member $a$ into which projected.

While the invention has been described as a single operation, it may be, and in practice is, used in automatic rapid repeat welding apparatus in which work to be welded is rapidly moved to and from welding position.

I wish it understood that the invention is capable of numerous modifications and changes without departing from the spirit of the claims.

What I claim is:

1. The method of welding together two metal members having different electrical resistance characteristics with the member of greater resistance having at least one integral protuberance on the face thereof opposing the other member, which method comprises concurrently applying a clamping pressure and a gradient electric welding heat to the members to successively cause a softening of the metal of the lesser resistant member in the zone of contact of the protuberance therewith, a predetermined depth of penetration under applied pressure of the protuberance into the metal at said zone, and a surface softening of the protuberance metal whereby a welding of the protuberance metal to the penetrated metal of the other member is effected.

2. The method of welding together two metal members having different electrical resistance characteristics with the member of greater resistance having at least one protuberance on the face thereof opposing the other member, which method comprises concurrently applying an electric welding heat and clamping pressure to the two members with the applied heat first sufficient to soften the metal of the member of least resistance in the zone of contact of the protuberance therewith but not to soften the metal of the other member and with the pressure causing penetration of the protuberance into the softened metal zone and increasing the welding heat to subsequently effect a partial softening of the metal of the protuberance to form a strong welding connection between it and the metal of the other member.

3. The method of welding together two metal members having different electrical resistance characteristics with the member of greater resistance having at least one protuberance on the face thereof opposing the other member, which method comprises concurrently applying an electric welding clamping pressure and heat to the two members with the heat first applied over a predetermined slope range to soften the metal of the less resistant member at the zone of contact and cause the protuberance to penetrate the metal in said zone a predetermined extent, and subsequently applying substantially constant heat to the end of the welding operation to surface soften the protuberance and integrally bond it with the imbedding metal of the other member.

4. The method of welding together two metal members having different electrical resistance characteristics with the member of greater resistance having at least one protuberance on the face thereof opposing the other member, which method comprises concurrently applying an electric welding clamping pressure and heat to the two members with the heat first applied over a predetermined slope range to soften the metal of the less resistant member at the zone of contact and cause the protuberance to penetrate the metal in said zone a predetermined extent, and subsequently applying substantially constant heat to the end of the welding operation to surface soften the protuberance and integrally bond it with the imbedding metal of the other member, the welding heat slope range having an initial heat of from 40% to 60% of its final heat and of a cyclic length to soften the contact zone of the less resistant member to penetrating condition, and the final heat range being of a cyclic length and temperature to surface soften the protuberant member and complete the weld.

5. The method as called for in claim 4 wherein the minimum length of the slope range is 2 cycles and the minimum length of the complete welding operation is 4 cycles.

6. The method of welding together two metal members having different electrical resistance characteristics with the member of greater resistance having at least one protuberance on the face thereof opposing the other member, which method comprises concurrently applying a welding clamping pressure and an electric welding heat to the two members during a welding cycle, the welding heat having an initial temperature less than the softening temperature of the member of less resistance and increasing over a predetermined number of current cycles to a temperature sufficient to surface soften the protuberance and continuing this heat to the end of the welding cycle, the softening of the less resistant member in the zone of contact and a penetration thereof under the applied pressure by said protuberance occurring substantially during said first heat range and a surface softening and welding of the protuberance to the metal in which imbedded occurring substantially during said second heat range period.

7. The method of welding a mild steel nut of approximately 1010 steel to a carbon steel strip of approximately 1060 steel and wherein the strip has at least one protuberance in contact with a face of the nut to initially hold the nut and strip in spaced relation, which method comprises concurrently applying a predetermined welding clamping pressure and a predetermined electric welding heat to the members to first cause a softening of the nut in the zone of contact of the protuberance therewith and a penetration of the protuberance therein, and subsequently to soften the surface portion of the protuberance to integrally bond it with the softened portion of the nut, the major body portion of the protuberance remaining unsoftened and in firm anchorage connection with the strip whereby welding flash is reduced to a minimum to prevent injury to the nut thread, the welding clamping pressure during the welding operation being approximately 10 to 25 pounds per square inch for every .001" of protuberance height.

References Cited in the file of this patent

UNITED STATES PATENTS

| | | |
|---|---|---|
| 1,736,539 | Lackman | Nov. 19, 1929 |
| 2,021,173 | Clark | Nov. 19, 1935 |
| 2,087,530 | Potchen | July 20, 1937 |